United States Patent
Shin

(10) Patent No.: US 10,390,650 B2
(45) Date of Patent: Aug. 27, 2019

(54) APPARATUS AND METHOD FOR EXTRACTING DUTCH COFFEE

(71) Applicant: ONEDUTCH CO., LTD., Ansan-si, Gyeonggi-do (KR)

(72) Inventor: Sung Kyun Shin, Gyeonggi-go (KR)

(73) Assignee: ONEDUTCH CO., LTD., Ansan-si, Gyeonggi-do (KR)

( * ) Notice: Subject to any disclaimer, the term of this patent is extended or adjusted under 35 U.S.C. 154(b) by 237 days.

(21) Appl. No.: 15/506,952

(22) PCT Filed: Aug. 7, 2015

(86) PCT No.: PCT/KR2015/008318
§ 371 (c)(1),
(2) Date: Feb. 27, 2017

(87) PCT Pub. No.: WO2017/022876
PCT Pub. Date: Feb. 9, 2017

(65) Prior Publication Data
US 2017/0280918 A1 Oct. 5, 2017

(30) Foreign Application Priority Data
Jul. 31, 2015 (KR) .......................... 10-2015-0108894

(51) Int. Cl.
*A47J 31/00* (2006.01)
*A47J 31/24* (2006.01)
(Continued)

(52) U.S. Cl.
CPC ............... *A47J 31/24* (2013.01); *A47J 31/02* (2013.01); *A47J 31/06* (2013.01); *A47J 31/0621* (2013.01);
(Continued)

(58) Field of Classification Search
CPC ............................. A47J 31/0631; A47J 31/10
(Continued)

(56) References Cited

U.S. PATENT DOCUMENTS 2,844,088 A * 7/1958 Von Wertaur ......... A47J 31/043
99/292
3,587,444 A * 6/1971 Godel ................... A47J 31/106
99/282

(Continued)

FOREIGN PATENT DOCUMENTS

KR 10-2012-0106406 A 9/2012
KR 10-1225535 B1 1/2013
(Continued)

*Primary Examiner* — Reginald Alexander
(74) *Attorney, Agent, or Firm* — Novick, Kim & Lee, PLLC; Jae Youn Kim

(57) ABSTRACT

The present invention relates to a method for extracting Dutch coffee and an apparatus thereof, and more particularly, to a method for extracting Dutch coffee, which can exactly control a speed of extraction of Dutch coffee and an amount of coffee to be extracted by supplying water during a predetermined time repeatedly at regular time intervals in each step, can always provide Dutch coffee of a constant concentration to consumers by uniformly distributing water to a filtering container, and can provide a rich aroma of Dutch coffee by collecting the aroma of Dutch coffee not to dissipate, and an apparatus thereof. The method for extracting Dutch coffee controls an amount of extracted coffee by setting an opening time of a valve mounted between a water tank and a filtering container, controls a speed of extraction by setting one cycle length, and mechanically controls a total speed of extraction by setting a total time, and the Dutch coffee extraction apparatus includes: an upper main body frame; a lower main body frame which is formed on a lower portion of the upper main body frame and has a width shorter than that of the upper main body frame; a side frame (Continued)

which connects the upper main body frame and the lower main body frame with each other; a water tank which is disposed inside the upper main body frame and has a cover provided on an upper portion thereof to store water therein; a filtering container which is disposed at both sides of the lower main body frame, is connected with the water tank via a nozzle to receive water from the water tank, and stores ground coffee thereon; an extracted liquid storage container which is disposed under the filtering container to store an extracted liquid thereon; and a digital operation unit which is formed on one side of the side frame.

7 Claims, 11 Drawing Sheets

(51) Int. Cl.
*A47J 31/10* (2006.01)
*A47J 31/06* (2006.01)
*A47J 31/02* (2006.01)
*A47J 31/40* (2006.01)
*A47J 31/46* (2006.01)
*A47J 31/52* (2006.01)

(52) U.S. Cl.
CPC ........... *A47J 31/0631* (2013.01); *A47J 31/10* (2013.01); *A47J 31/40* (2013.01); *A47J 31/402* (2013.01); *A47J 31/46* (2013.01); *A47J 31/52* (2013.01); *A47J 31/00* (2013.01)

(58) Field of Classification Search
USPC .......................................... 99/306, 304, 315
See application file for complete search history.

(56) References Cited

U.S. PATENT DOCUMENTS

| | | | |
|---|---|---|---|
| 5,393,548 A | | 2/1995 | Heiligman |
| 5,910,205 A | * | 6/1999 | Patel .................. A47J 31/0642 99/307 |
| 8,418,602 B2 | * | 4/2013 | Magg .................. A47J 31/4467 99/295 |
| 2016/0324365 A1 | * | 11/2016 | Pan ......................... A47J 31/10 |

FOREIGN PATENT DOCUMENTS

| | | |
|---|---|---|
| KR | 10-1306268 B1 | 9/2013 |
| KR | 20-0470316 Y1 | 12/2013 |
| KR | 10-1392192 B1 | 5/2014 |
| WO | 2014/178612 A1 | 11/2014 |

* cited by examiner

APPARATUS AND METHOD FOR EXTRACTING DUTCH COFFEE

TECHNICAL FIELD

The present invention relates to a method for extracting Dutch coffee and an apparatus thereof, and more particularly, to a method for extracting Dutch coffee, which can exactly control a speed of extraction of Dutch coffee and an amount of coffee to be extracted by supplying water during a predetermined time repeatedly at regular time intervals in each step, can always provide Dutch coffee of a constant concentration to consumers by uniformly distributing water to a filtering container, and can provide a rich aroma of Dutch coffee by collecting the aroma of Dutch coffee not to dissipate.

BACKGROUND ART

In general, drip coffee which is made by dripping boiling water over ground coffee, which is prepared in a filtering device after being roasted and ground, or an espresso which is brewed by passing boiling water under high pressure through finely ground and compressed coffee beans is regularly used.

In recent years, many people increasingly prefer Dutch coffee which is extracted using normal water or cold water for a long time, about 3-24 hours.

In addition, an extracted liquid of Dutch coffee ages with time and has more distinctive flavor and aroma. In addition, since Dutch coffee is extracted using normal water, it contains less caffeine than drip coffee or an espresso which is extracted in boiling water, and has a deep, soft flavor.

In addition, since the Dutch coffee can be stored for a long time and the aroma and flavor of coffee which may dissipate due to boiling water may be extracted as they are, the Dutch coffee can provide the rich aroma of coffee and distinctive flavors that hot coffee does not provide, such as a bitter flavor, a sour flavor, and a sweet flavor.

A related-art Dutch coffee extraction apparatus controls a speed of extraction of Dutch coffee and an amount of coffee to be extracted using a valve. However, the valve should be manually opened and closed by a user to control the speed of extraction and the amount of coffee to be extracted In addition, in order to control the speed of extraction and the amount of coffee to be extracted after the valve is opened, the valve is minutely controlled. However, since the Dutch coffee is extracted for a long time, it is common that the coffee is extracted at the same speed and by the same amount from the time the Dutch coffee is initially extracted until the time the extraction is completed.

Therefore, the related-art Dutch coffee extraction apparatus may fail to control the speed of brewing of an extracted liquid which is extracted while passing through a filtering container, and there may be a problem that the flavor and aroma of the extracted liquid of the Dutch coffee are spoiled and quality deteriorates. In addition, since ground coffee does not stay for as much time as desired, the concentration of the extracted liquid becomes low, and accordingly, there is a problem that the production of products decreases.

In addition, in a process in which water in a water tank drops down to the filtering container which contains ground coffee powder, water may not drop down to the whole coffee powder and may flow down along the wall of the filtering container. Therefore, the water may be brought into contact with only the coffee powder existing around the circumference of the filtering container. As a result, Dutch coffee of a constant concentration may not be extracted and thus Dutch coffee of a low concentration may be extracted.

In addition, there may be inconvenience that the user should stop continuously extracting the Dutch coffee in order to prevent water from being supplied only to the circumference of the filtering container, and should shake coffee powder contained in the filtering container in order to change the positions of the coffee powder. Since the user should stop continuously extracting coffee, the quality of extracted coffee unavoidably deteriorates.

In addition, since the aroma generated when the Dutch coffee is extracted is not collected in an extracted liquid storage container and the aroma of the Dutch coffee dissipates, the user may not feel the rich aroma of the Dutch coffee when drinking it and also may not feel the taste due to the reduced aroma.

In addition, the related-art apparatus may have a filter installed in a narrow extraction pipe which is disposed under the filtering container in order to convey the extracted Dutch coffee to the extracted liquid storage container, and it is common that Dutch coffee is contained on the upper portion of the filter.

However, since coffee powder is contained in the narrow extraction pipe, the coffee powder may agglomerate when water is supplied to the coffee powder, and thus, the extracted liquid may not be extracted to an extracted liquid conveying means at the right time and may stay in the filtering container with the coffee powder for a long time. To this end, a maximum value of an action of extracting ingredients of coffee powder is exceeded and there is a problem that a bitter flavor of coffee powder having water solubility is extracted.

In addition, since water stays in coffee powder for more than a predetermined time, oil may be produced from the coffee powder and coffee may taste like oil. Extracting may excessively be performed and thus bad ingredients may be extracted.

In addition, since the related-art Dutch coffee extraction apparatus has the single filtering container installed under the water tank, and has a single extraction container installed under the single filtering container, and should continuously extract for about 3-24 hours, it is common that a large amount of coffee cannot be extracted at one time.

Therefore, there is a problem that an amount of Dutch coffee extracted within a predetermined time is limited and thus more Dutch coffee cannot be provided to consumers.

In addition, since many Dutch coffee extraction apparatuses should be provided in order to extract more Dutch coffee, there is a problem that it cost much to buy Dutch coffee extraction apparatuses.

PRIOR ART DOCUMENTS

Patent Documents (Patent Document 1) Patent Registration No. 10-1392192
(Patent Document 2) Utility Model Registration No. 20-0470316

DETAILED DESCRIPTION OF THE PRESENT DISCLOSURE

Technical Objects

The present invention relates to a method for extracting Dutch coffee and an apparatus thereof, and more particularly, to a method for extracting Dutch coffee, which can exactly control a speed of extraction of Dutch coffee and an amount of coffee to be extracted by supplying water during a predetermined time repeatedly at regular time intervals in each step, can always provide Dutch coffee of a constant concentration to consumers by uniformly distributing water to a filtering container, and can provide a rich aroma of Dutch coffee by collecting the aroma of Dutch coffee not to dissipate, and an apparatus thereof.

Technical Solving Means

The present invention has been developed in order to achieve the above-described object, and provides a Dutch coffee extraction apparatus, including: an upper main body frame; a lower main body frame which is formed on a lower portion of the upper main body frame and has a width shorter than that of the upper main body frame; a side frame which connects the upper main body frame and the lower main body frame with each other; a water tank which is disposed inside the upper main body frame and has a cover provided on an upper portion thereof to store water therein; a filtering container which is disposed at both sides of the lower main body frame, is connected with the water tank via a nozzle to receive water from the water tank, and stores ground coffee thereon; an extracted liquid storage container which is disposed under the filtering container to store an extracted liquid thereon; and a digital operation unit which is formed on one side of the side frame, wherein the filtering container includes: a container main body which is formed in a cylindrical shape, penetrating from top to bottom; a distributing means which includes: a water supply surface which is formed on the upper end of the container main body and is downwardly inclined from the center toward the side surface so as to spray water supplied through the nozzle into the container main body; a water flow blocking surface which is upwardly inclined from the end of the water supply surface toward the side surface; a plurality of water passing holes passing through the top surface and the bottom surface of the water supply surface; and a center drop inducing means which is formed on the top surface and the bottom surface of the water supply surface at a point spaced from the center of the water supply surface toward the outer circumference by a predetermined distance, and protrudes in an annular shape so as to prevent the supplied water from flowing down along the wall surface of the filtering container; a filtering container upper cover which is formed to cover the upper portion of the distributing means and has a water supply portion formed thereon to receive water from the water tank; and a filtering container lower cover which has an upper portion inserted into the inner surface of the lower portion of the container main body, and a lower portion formed in a funnel shape.

In addition, an extraction inducing means may be inserted into the filtering container lower cover, and may include a body which is formed in a cylindrical shape and is hollow inside, and a plurality of ribs which are formed on the cylindrical body in a radial direction to as to correspond to an inner inclined surface of the filtering container lower cover.

In addition, a filter may be additionally provided on the upper portions of the ribs and coffee powder may be contained on the upper portion of the filter.

In addition, a suction inducing means may be additionally formed on the top surface of the filtering container upper cover, and may be downwardly inclined from a point spaced from the circumference of the top surface by a predetermined distance to the water supply portion to prevent the aroma of extracted Dutch coffee from dissipating.

Furthermore, each of the water passing holes may be formed by passing through the water supply surface and may have a diameter larger on a bottom surface than a top surface, and the water passing holes are formed to draw concentric circles on the water supply surface, and the plurality of water passing holes may be formed from the center of the water supply surface along the outer circumference at regular intervals.

In addition, the filtering container lower cover may include: a container main body insertion portion which is inserted into the container main body, being spaced from the circumference of the container main body by a predetermined distance, and is inwardly inclined; a container main body contacting portion which protrudes from the lower portion of the container main body insertion portion outwardly, and has a sealing member inserted thereinto so as to be brought into close contact with the container main body; a vertical portion which vertically extends from the bottom surface of the container main body contacting portion at a point inwardly spaced from the circumference of the container main body contacting portion; a container main body seating portion which protrudes from the end of the vertical portion outwardly so as to have the end of the container main body seated thereon; and a funnel portion which is downwardly inclined from the lower portion of the container main body seating portion toward the center, and has an extraction pipe passing through the center thereof in a vertical direction.

In addition, the digital operation unit which sets to operate by adjusting a valve opening time, one cycle length, and a total time in a maceration step, an extraction step, and a concentration adjustment step, may include: a maceration step setting display unit which displays set times of the maceration step, and includes a first opening interval display member for displaying one cycle length, a first opening time display member for displaying a valve opening time, and a first total time display member for displaying a total time; an extraction step setting display unit which displays set times of the extraction step, and includes a second opening interval display member for displaying one cycle length, a second opening time display member for displaying a valve opening time, and a second total time display member for displaying a total time; and a concentration adjustment setting display unit which displays set times of the concentration adjustment step, and includes a third opening interval display member for displaying one cycle length, a third opening time display member for displaying a valve opening time, and a third total time display member for displaying a total time.

The present invention has been developed in order to achieve the above-described object, and provides a method for extracting Dutch coffee, which controls an amount of extracted coffee by setting an opening time of a valve mounted between a water tank and a filtering container, controls a speed of extraction by setting one cycle length, and mechanically controls a total speed of extraction by setting a total time, the method including an extraction step of continuously extracting Dutch coffee, and wherein, in the extraction step, the opening time of the valve is set to 0.01-10 seconds, one cycle length is set to 1-99 seconds, and the total time required to repeat opening and closing of the valve is set to 2-24 hours.

In addition, the method may further include, before the extraction step, a maceration step of macerating coffee powder by pouring water over coffee powder contained in the filtering container such that the coffee powder absorbs water and coffee is extracted, and, in the maceration step, the opening time of the valve may be set to 0.1 to 99 seconds, one cycle length may be set to 10-99 minutes, and the total time may be set to 10 minutes to 3 hours.

The method may further include, after the extraction step, a concentration adjustment step of adjusting a concentration of Dutch coffee at the same time of extracting Dutch coffee, and, in the concentration adjustment step, the opening time of the valve may be set to 0.01 to 10 seconds, one cycle length may be set to 1-99 seconds, and the total time may be set to 10 minutes to 3 hours.

In addition, in the maceration step, the opening time of the valve may be set such that an amount of water supplied to the filtering container is made to be 5-20 wt % of an amount of coffee powder contained in the filtering container.

Advantageous Effect

According to the present invention, the following effects can be achieved:

The first effect is extracting coffee of a constant concentration according to an amount of coffee powder contained in the filtering container by uniformly supplying water by means of the distributing means, which is provided to prevent water from flowing down to the filtering container containing ground coffee powder along the wall surface of the container main body, and always providing Dutch coffee of a constant concentration.

The second effect is providing the rich aroma of coffee by providing the suction inducing means in the filtering container upper cover to collect the aroma in the extracted liquid storage container, and thus preventing the aroma of Dutch coffee from dissipating or failing to be contained in the extracted liquid container.

The third effect is increasing an amount of an extracted liquid to be extracted by inserting the extraction inducing means into the funnel portion of the filtering container lower cover and placing coffee powder on the upper end of the extraction inducing means, and extracting Dutch coffee of an appropriate concentration by preventing extracted coffee powder from agglomerating toward the narrow extraction pipe.

The fourth effect is extracting more Dutch coffee by connecting the plurality of filtering containers to the water tank and providing the same number of extracted liquid storage containers as the number of filtering containers, and extracting enough Dutch coffee even when a part of the extracted liquid storage container is damaged.

The fifth effect is producing Dutch coffee of constant flavor and aroma by mechanically controlling the speed of extraction and the amount of coffee to be extracted when Dutch coffee is extracted.

The sixth effect is producing Dutch coffee of deep and soft flavor and aroma by differently controlling the speed of extraction and the amount of coffee to be extracted in each step of the maceration step, the extraction step, and the concentration adjustment step.

BEST MODE FOR EMBODYING THE INVENTION

Figure 1:
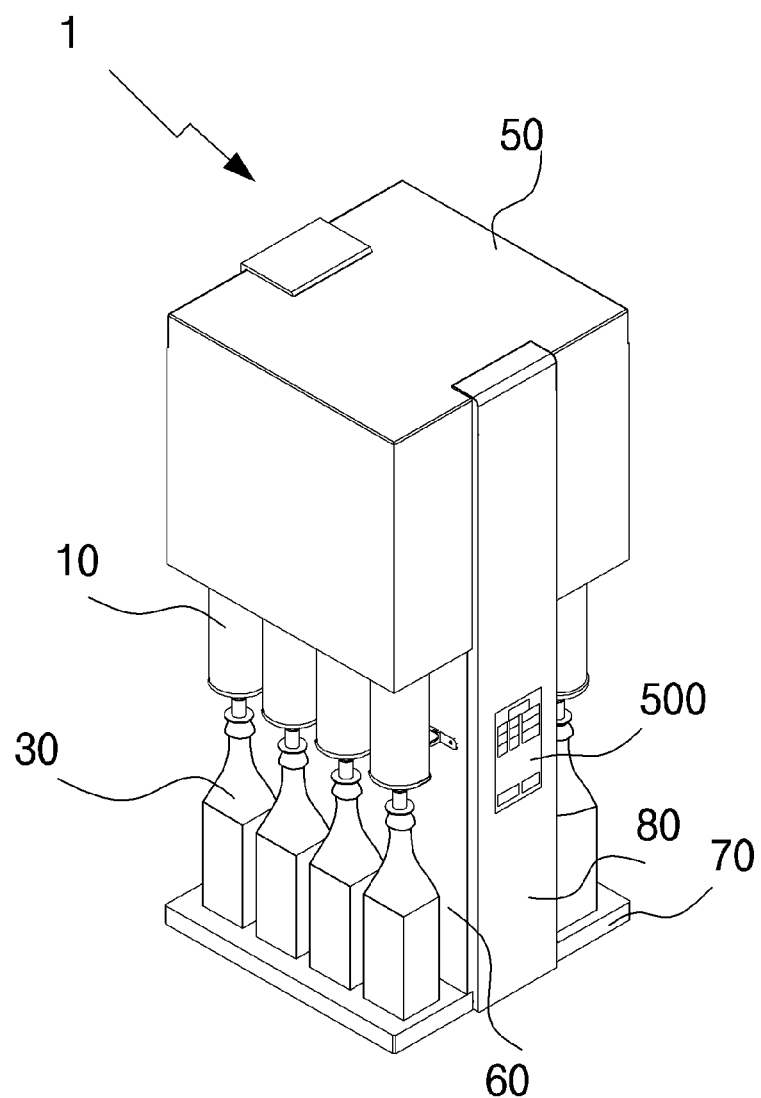
FIG. 1 is a view showing the appearance of a Dutch coffee extraction apparatus according to the present invention.
Figure 2:
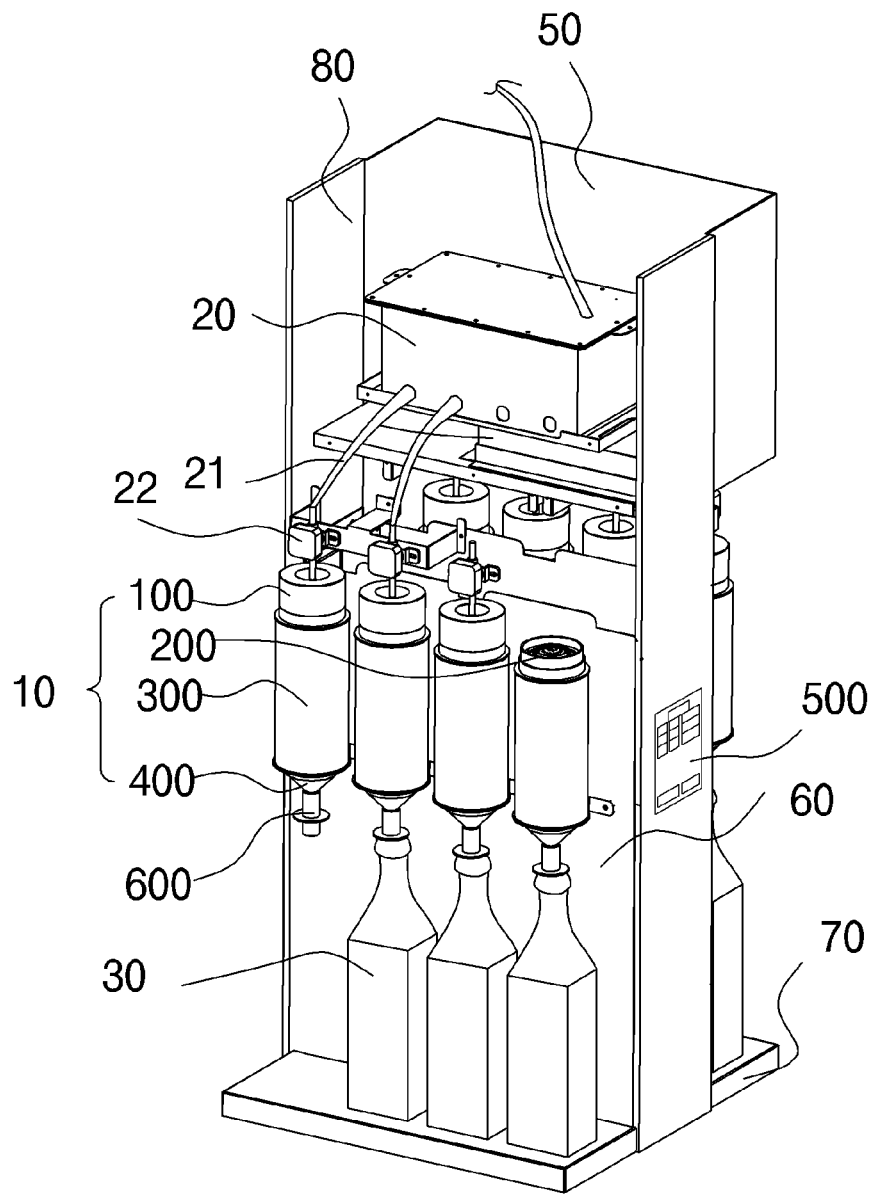
FIG. 2 is a perspective view showing the inside of the Dutch coffee extraction apparatus according to the present invention.
Figure 3:
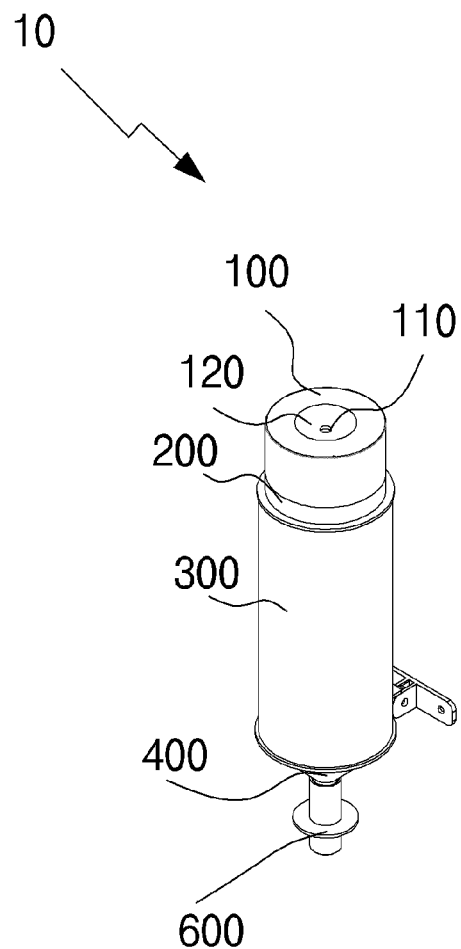
FIG. 3 is a view showing a filtering container of the Dutch coffee extraction apparatus according to the present invention.
Figure 4:
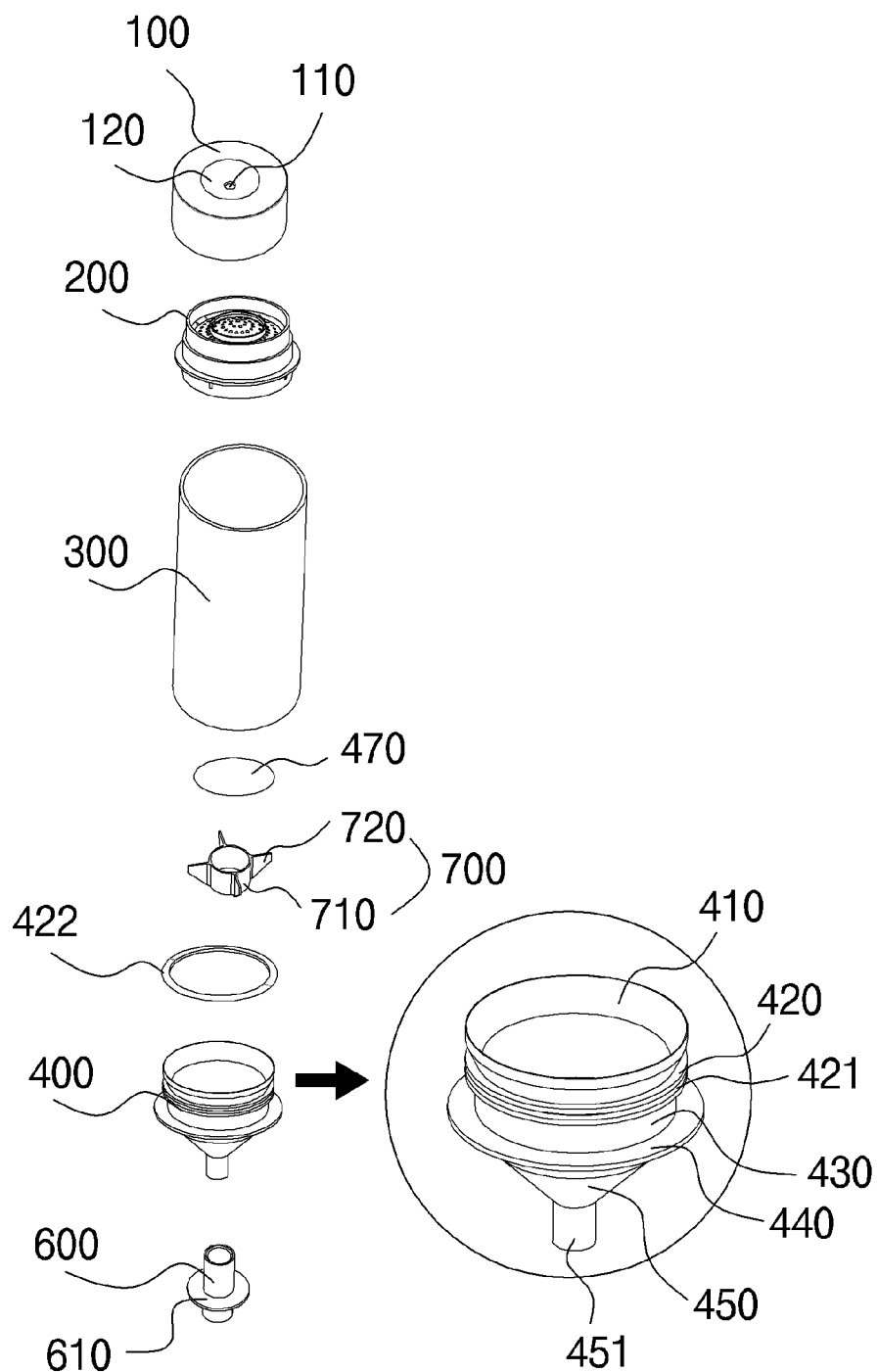
FIG. 4 is an exploded perspective view of the filtering container of the Dutch coffee extraction apparatus.
Figure 5A:
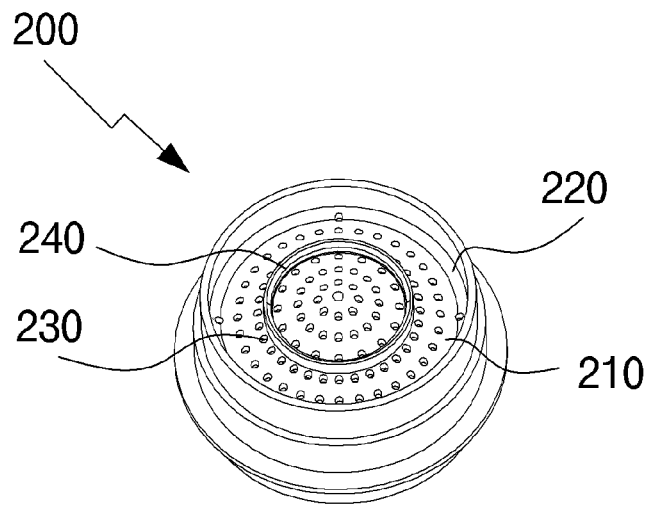
FIGS. 5(a) and 5(b) are perspective views showing the upper and lower portions of a distributing means included in the filtering container of the Dutch coffee extraction apparatus according to the present invention.
Figure 5B:
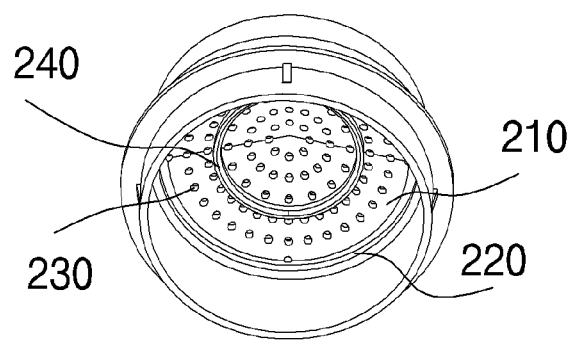

Hereinafter, preferred embodiments of the present invention will now be described with reference to the accompanying drawings.

Prior to explaining the present invention, the specific structure or functions presented below are merely illustrated for the purpose of explaining embodiments according to the concept of the present invention, and the embodiments according to the concept of the present invention may be implemented in various forms and should not be interpreted as being limited to the embodiments described in the present specification.

A Dutch coffee extraction apparatus 1 includes an upper main body frame 50 which has a cuboid shape which is similar in width, length, and height, and a lower main body frame 60 which has the same length as that of the upper main body frame 50 in the vertical direction, and is formed at a predetermined distance from the center of the upper main body frame 50 in the horizontal direction to have a width shorter than that of the upper main body frame 50.

In addition, a bottom frame 70 which has a similar area to that of the upper main body frame 50 may be formed on the lower portion of the lower main body frame 60, and the inside of the upper main body frame 50 and the inside of the lower main body frame 60 fluidly communicate with each other.

In addition, a side frame 80 which has the same width as that of the lower main body frame 60 may be formed from the upper end to the lower end of the lower main body frame 60 in order to connect the upper main body frame 50 and the lower main body frame 60 with each other.

The Dutch coffee extraction apparatus 1 formed of the above-described frames may include a water tank 20 for storing water therein, a filtering container disposed under the water tank 20, for storing ground coffee powder therein, and an extracted liquid storage container 30 disposed under the filtering container 10, for storing an extracted liquid extracted in the filtering container 10.

The water tank 20 may be disposed inside the upper main body frame 50, and the filtering container 10 and the extracted liquid storage container 30 may be disposed the outside the lower main body frame 60.

In addition, the Dutch coffee extraction apparatus 1 may be formed lengthways from top to bottom, and the water tank 20, the filtering container 10, and the extracted liquid storage container 30 may be arranged in sequence from top to bottom.

The water tank 20, which is disposed in the uppermost portion of the Dutch coffee extraction apparatus 1, is a tank which stores water therein, and water filled in the water tank 20 may be provided from a separate tank which is provided on the outside of the Dutch coffee extraction apparatus 1 or may be directly provided from a water supply plant for suppling water. However, this should not be considered as limiting.

In addition, the water tank 20, which is disposed in the uppermost portion of the Dutch coffee extraction apparatus, may store water therein, and may be connected with the filtering container 10 via a nozzle 21 to supply water to the filtering container 10 and have Dutch coffee extracted.

The filtering container 10, which receives water from the water tank 20 as described above and extracts Dutch coffee, may include one or more containers to extract a large amount of coffee. Preferably, eight filtering containers 10 in total, four at each side of the lower main body frame 60, may be provided, and also, water may be supplied to the filtering container 10 from the water tank 20.

The filtering container 10 may include a distributing means 200, a container main body 300, a filtering container upper cover 100, and a filtering container lower cover 400.

The container main body 300 may be formed in a cylindrical shape, penetrating from top to bottom, in order to store ground coffee powder and temporarily store water supplied from the water tank 20 to extract Dutch coffee.

In addition, the distributing means 200 may be connected with the upper end of the container main body 300 to correspond thereto and may be connected with the container main body 300 by being inserted thereinto. The distributing means 200 may be formed to uniformly spray water supplied from the water tank 20 into the container main body 300 without letting water flow down along the wall surface of the container main body 300.

The distributing means 200 may be formed in a cylindrical shape, and may include a power supply surface 210, water passing holes 230, and a center drop inducing means 240. The water supply surface 210 may be formed to be downwardly inclined from the center toward the outer circumference so as to uniformly spray water supplied from the water tank 20, and may be formed to a point spaced from the side surface of the distributing means 200 by a predetermined distance.

In addition, each of the water passing holes 230 may be formed in a circular shape and the plurality of water passing holes 230 may be formed on the entire of the water supply surface 210r.

Herein, each of the water passing holes 230 may be formed, penetrating through the top and the bottom of the water supply surface 210, and may be formed in a circular shape and may be inclined such that its diameter gradually increases from the top of the water supply surface 210 to the bottom of the water supply surface 210.

Accordingly, when water passes through the water passing holes 230, water does not directly pass and is gathered at the lower portion of each of the water passing holes 230 having a large diameter, and, when water flows in from the upper portion, the water falls down to the distributing means 200 by pressure of water and uniformly drops down to the distributing means 200.

In addition, the center drop inducing means 240 may be formed on the top surface and the bottom surface of the water supply surface 210 at a predetermined distance from the center of the water supply surface 210 toward the outer circumference, in order to prevent water supplied from the water tank 20 from flowing down along the wall surface of the distributing means 200, and the center drop inducing means 240 may protrude in an annular shape.

The center drop inducing means 240 is formed on the top surface of the water supply surface 210, such that a part of the water supplied from the water tank 20 and dropping down to the water supply surface 210 can be prevented from flow into the circumference of the water supply surface 210, and can drop down to the center of the filtering container 10. In addition, the center drop inducing means 240 is formed on the bottom surface of the water supply surface 210, such that water passing in the center drop inducing means 240 formed on the top surface of the water supply portion 110 can be prevented from flowing along the bottom surface of the water supply surface 210 and dropping down along the wall surface of the container main body 300.

In addition, a water flow blocking surface 220 may be formed in the distributing means 200 to be upwardly inclined from the end of the water supply surface 210 toward the side surface of the distributing means 200.

In addition, the water passing holes 230 may be additionally formed on a boundary between the water supply surface 210 and the water flow blocking surface 220 to drop the supplied water down to the distributing means 200, and the water passing holes 230 may be formed on the boundary between the water supply surface 210 and the water flow blocking surface 220 in all directions.

Accordingly, water flowing over the center drop inducing means 240 and flowing into the side surface of the distributing means 200 can be prevented from flowing into the side surface of the distributing means 200 due to the presence of the water flow blocking surface 220 and the water passing holes 230, and the supplied water can be prevented from flowing down along the wall surface of the container main body 300.

In this case, the top surface and the bottom surface of the water supply surface 210 may be equally inclined, and the top surface and the bottom surface of the water flow blocking surface 220 may be equally inclined.

The filtering container upper cover 100 may be formed on the upper portion of the distributing means 200 in the form of a lid to cover the distributing means 200, and may include a water supply portion 110 formed on the center of the top surface thereof to receive water.

In addition, a suction inducing means 120 may be additionally formed from a point spaced from the circumference of the top surface of the filtering container upper cover 100 by a predetermined distance, and may be downwardly inclined toward the water supply portion 110, thereby preventing the aroma of extracted Dutch coffee extracted from dissipating.

The filtering container upper cover 100 tightly seals and closes the upper portion of the distributing means 200, thereby preventing the aroma from being discharged to the outside, and the suction inducing means 120 downwardly inclined makes the aroma flow down such that the aroma of the extracted Dutch coffee is collected in the extracted liquid storage container 30.

In addition, the filtering container lower cover 400 may be formed on the lower portion of the container body 300, and has an upper portion inserted into the inner surface of the lower portion of the container body 300, and has a lower portion downwardly inclined from the outside toward the center, and includes an extraction pipe 451 passing through the center thereof in the vertical direction, thereby having a funnel shape.

The filtering container lower cover 400 may be formed in the funnel shape so as to easily convey an extracted liquid to the extracted liquid storage container 30, and an extraction inducing means 700 may be inserted into the filtering container lower cover 400.

In addition, the filtering container lower cover 400 may be divided into a container main body insertion portion 410, a container main body contacting portion 420, a vertical portion 430, a container main body seating portion 440, and a funnel portion 450, and the container main body insertion portion 410 is a portion to be inserted into the container main body 300 and has an upper end smaller than the inner circumference of the container main body 300.

Specifically, since coffer powder used when Dutch coffee is extracted should have particles larger than particles of coffee bean powder used when an espresso is extracted, the circumference of the container main body insertion portion 410 may be formed, spaced from the inner circumference of the container main body 300 toward the inside as much as thickness of a particle of coffee bean powder used when an espresso is extracted.

In addition, the filtering container lower cover 400 may be formed to be inclined from its upper end toward its center by a predetermined angle to a point spaced from the upper end in a downward direction by a predetermined distance, such that the extracted liquid flowing into the distributing means 200 is gathered.

In addition, the container main body contacting portion 420 may protrude outwardly in order to be brought into close contact with the container main body 300 from the end point of the inclined surface to a predetermined point to prevent external air from flowing in, and in order to securely connect the container main body 300 and the filtering container lower cover 400, and may have a groove 420 dented inward on the center by a predetermined distance.

Therefore, a sealing member 422 may be inserted into the groove 421 of the container main body contacting portion 420, and may bring the container main body 300 and the filtering container lower cover 400 into close contact with each other without forming a gap therebetween when connecting the container main body 300.

In addition, the vertical portion 430 may be formed to vertically extend from a point inwardly spaced on the lower portion of the container main body contacting portion 420 by a predetermined distance, and the container main body seating portion 440 may be formed on the lower portion of the vertical portion 430.

In addition, the container main body seating portion 440 may be formed to protrude to have a diameter larger than the outer circumference of the container main body 300 in order to seat the lower end of the container main body 300 thereon.

Furthermore, the funnel portion 450 may be formed on the lower portion of the container main body seating portion 440, may be inclined from the outside toward the center so as to easily convey the extracted liquid to the extracted liquid storage container 30, and may be provided with the extraction pipe 451 vertically penetrating through the center thereof. The extraction inducing means 700 may be inserted into the funnel portion 450.

The extraction inducing means 700 may be formed in the same shape as that of the inclined inner surface of the filtering container 10, and may include a body 710 and a rib 720. The body 710 may be formed in a cylindrical shape and may be hollow inside.

In addition, a plurality of ribs 720 may be formed on the cylindrical body 710 in radial direction to correspond to the inner inclined surface of the filtering container lower cover 400, and four or six ribs 720 may be formed, but the number of ribs 720 is not limited.

In addition, a filter 470 may be seated on the upper portions of the ribs 720 and power powder may be contained on the upper portion of the filter 470 to extract Dutch coffee.

As described above, the container main body insertion portion 410 may be formed to be smaller than the container main body 300 as much as thickness of a particle of coffee bean powder used when an espresso is extracted, such that coffee powder, which is finer than the thickness of particles of coffee bean powder when an espresso is extracted, that is, coffee powder particles used when normal Dutch coffee is extracted, escape between the container main body insertion portion 410 and the container main body 300 and is placed on the upper portion of the container main body contacting portion 420.

Accordingly, a problem that an extracted liquid is not conveyed to the extracted liquid storage container due to fine coffee powder used when an espresso is extracted, such as coffee bean powder, and the extraction of Dutch coffee is stopped, can be prevented, and also, a degree of grinding of coffee powder can be identified.

Furthermore, when water is supplied, a part of the water flows between the container main body 300 and the container main body insertion portion 410, and the concentration of an undiluted solution of Dutch coffee extracted can be identified by extraction time.

In addition, the extraction inducing means 700 is inserted into the funnel portion 450 and the filter 470 is placed on the upper portion of the extraction inducing means 700, such that the extracted liquid can be extracted in a wide range and the amount of extracted liquid and the speed of extraction can be increased. Also, since coffee powder is contained on the upper portion of the filter 470, the coffee powder can be prevented from agglomerating in the narrow extraction pipe 451 and can be prevented from failing to extract Dutch coffee. In addition, Dutch coffee can be prevented from failing to be extracted, and can be prevented from staying in the distributing means 200 containing coffee powder for a long time.

In addition, an extracted liquid conveying means 600 may be provided on the upper portion of the extraction pipe 451 to convey the extracted liquid to the extracted liquid storage container 30, and the extracted liquid conveying means 600 has a lower portion inserted into the extracted liquid storage container 30.

In addition, a seating member 610 may be further provided on the center of the extracted liquid conveying means to protrude by a predetermined distance, such that the lower portion of the extracted liquid conveying means 600 is inserted into the entrance of the extracted liquid storage container and then is seated on the entrance of the extracted liquid storage container 30.

In additionally explaining the structure of the Dutch coffee extraction apparatus including the filtering container 10, a water level adjusting means (not shown) may be attached to the water tank 20 which supplies water to the filtering container 10, and may maintain a constant water level by adjusting an amount of water supplied to the water tank 20 according to an interval at which water is discharged to the filtering container 10 and an amount of water discharged to the filtering container 10, and may maintain a full water level, but this should not be considered as limiting.

In addition, the water level adjusting means may include a sensor for measuring the height of water or may use a floating ball which is used in a toilet bowl to adjust the water level. However, this should not be considered as limiting.

In addition, a solenoid valve 22 may be mounted on the nozzle 21 connecting the filtering container 10 and the water tank 20 in order to uniformly supply an appropriate amount of water to the filtering container 10, and also, the solenoid valve 22 may be provided to control time for supplying water to the filtering container 10 and an amount of water to be supplied.

A digital operation unit 500 may be provided on the side frame to control each of a maceration step (S2), an extraction step (S3), and a concentration adjustment step (S4) in order to control time for supplying water and an amount of water to be supplied using the solenoid valve 22. Specifically, the digital operation unit 500 may be provided with a maceration step setting display unit 510 for displaying settings of the maceration step (S2), an extraction step setting display unit 520 for displaying settings of the extraction step (S3), and a concentration adjustment setting display unit 530 for displaying settings of the concentration adjustment step (S4).

In addition, the maceration step setting display unit 510 may include a first opening interval display member 511 for displaying one cycle length, a first opening time display member 512 for displaying opening time of the valve, and a first total time display member 513 for displaying total time required to repeat the above-described process.

In addition, the extraction step setting display unit 520 may include a second opening interval display member 521 for displaying one cycle length, a second opening time display member 522 for displaying opening time of the valve, and a second total time display member 523 for displaying total time required to repeat the above-described process.

In addition, the concentration adjustment setting display unit 530 may include a third opening interval display member 531 for displaying one cycle length, a third opening time display member 532 for displaying opening time of the valve, and a third total time display member 533 for displaying total time required to repeat the above-described process.

In addition, the digital operation unit 500 may include a total extraction time display member 540 for displaying total time set in the first, second, and third total time display members 513, 523, and 533, an adjustment button 550 for setting time on each display member, and a move button (not shown) for moving to the next step in sequence and setting after completing one time setting using the adjustment button 550. However, this should not be considered as limiting.

In addition, the digital operation unit 500 may include a save button 570 to move to the next setting display unit by pressing the save button 570 after completing one time setting with the adjustment button 550. However, this should not be considered as limiting. The digital operation unit 500 may include a start button 560 to operate the extraction apparatus.

A method for extracting Dutch coffee using the digital operation unit 500 of the Dutch coffee extraction apparatus 1 will be described hereinafter. The Dutch coffee extraction method may set one cycle length of the valve provided between the water tank 20, in which water is stored, and the filtering container 10, in which ground coffee powder is stored and which is connected with the water tank to receive water from the water tank, may set opening time of the valve, and set total time required to repeat the process in which the valve is opened to conduct extraction and is closed, and extraction is performed again at the next opening time and the valve is closed again.

As described, the Dutch coffee extraction method may include a time setting step (S1) of setting one cycle length to control a speed of extraction of Dutch coffee, setting the valve opening time to control an amount of Dutch coffee extracted one time, and setting total time required to repeat opening and closing of the value so as to control the total speed of extraction.

Figure 6:
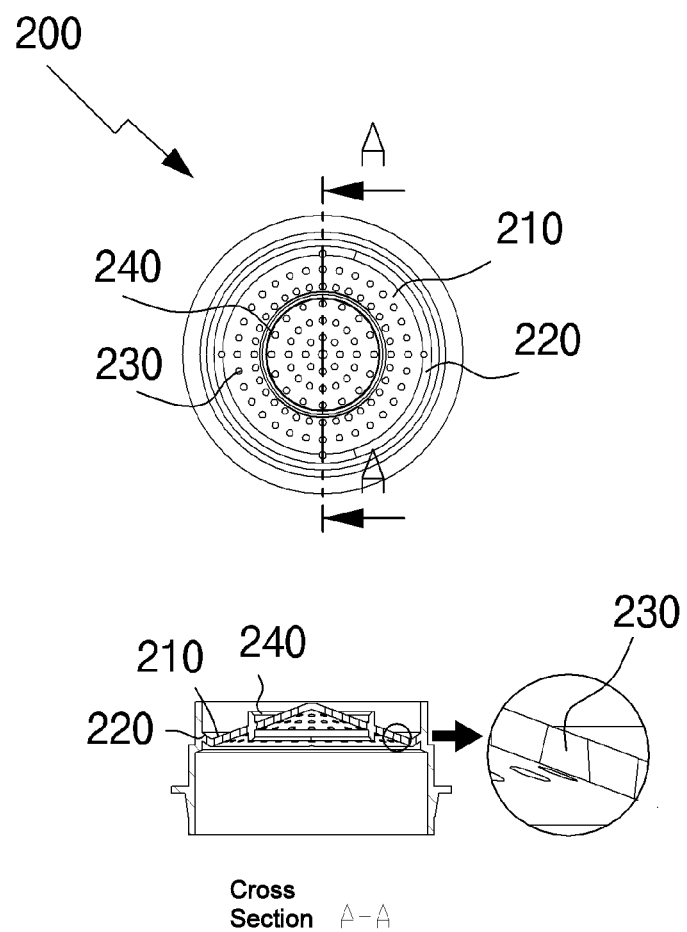
FIG. 6 is a cross section view showing the distributing means included in the filtering container of the Dutch coffee extraction apparatus according to the present invention.
Figure 7A:
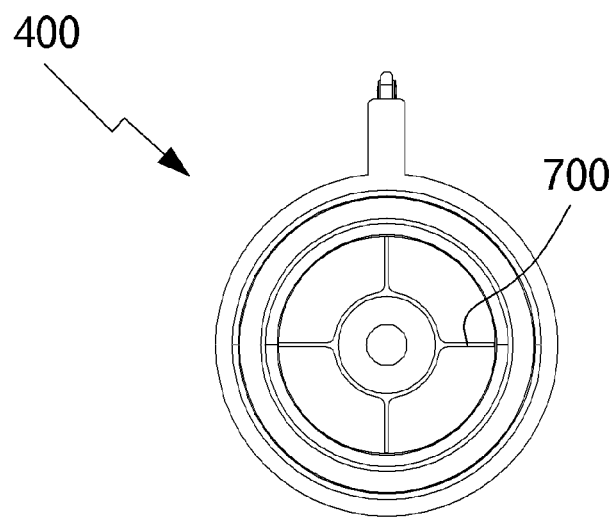
FIGS. 7(a) and 7(b) are a perspective view and a plane view showing an extraction inducing means which is inserted into a filtering container lower cover included in the filtering container of the Dutch coffee extraction apparatus according to the present invention.
Figure 7B:
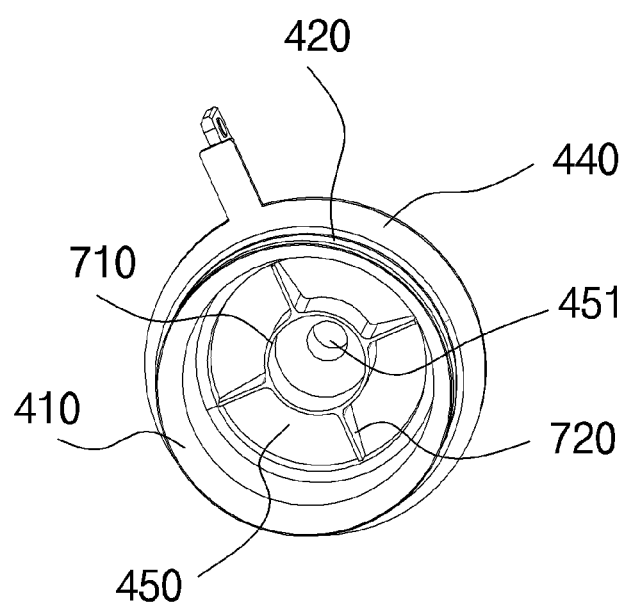
Figure 8:
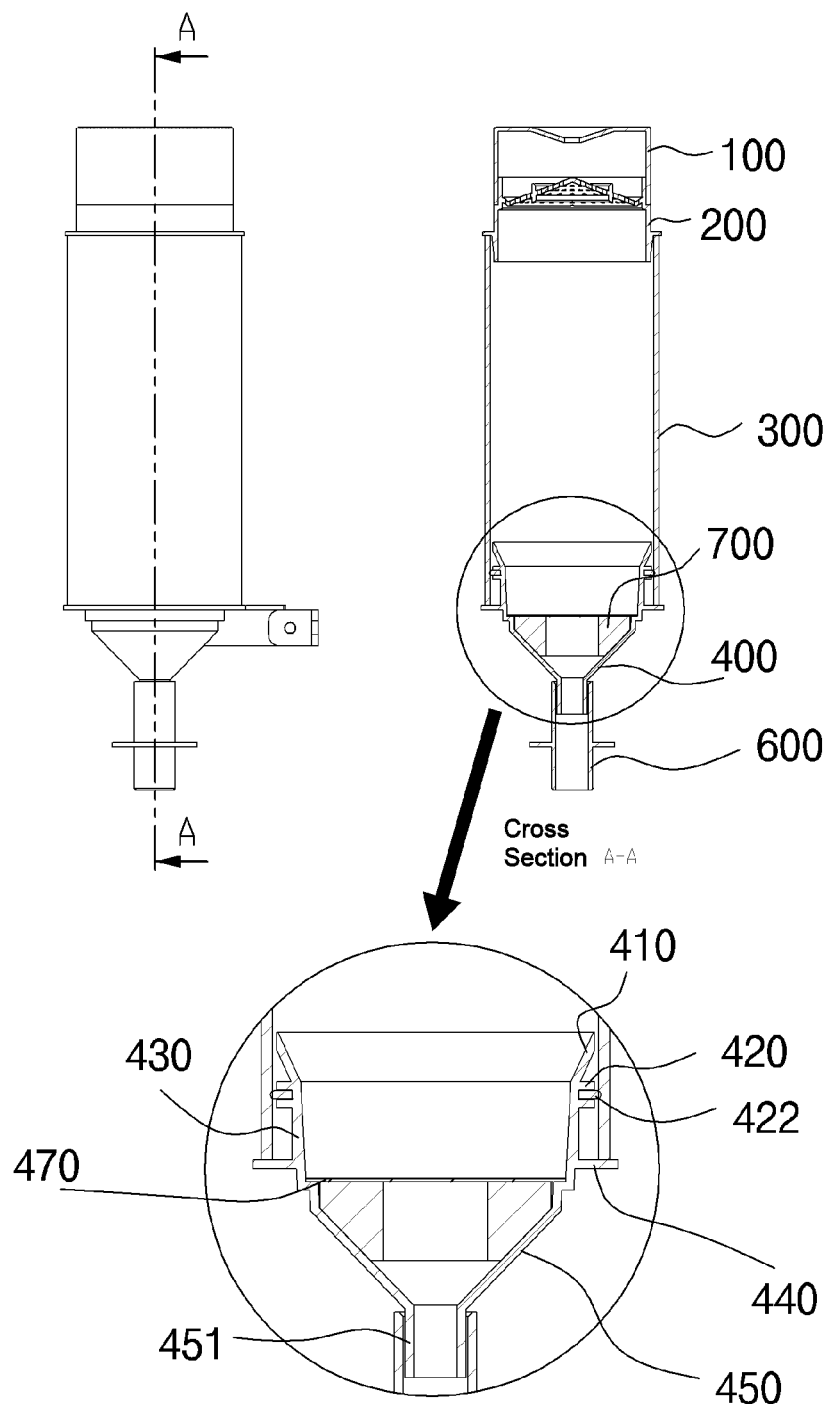
FIG. 8 is a cross section view of the filtering container of the Dutch coffee extraction apparatus according to the present invention.
Figure 9:
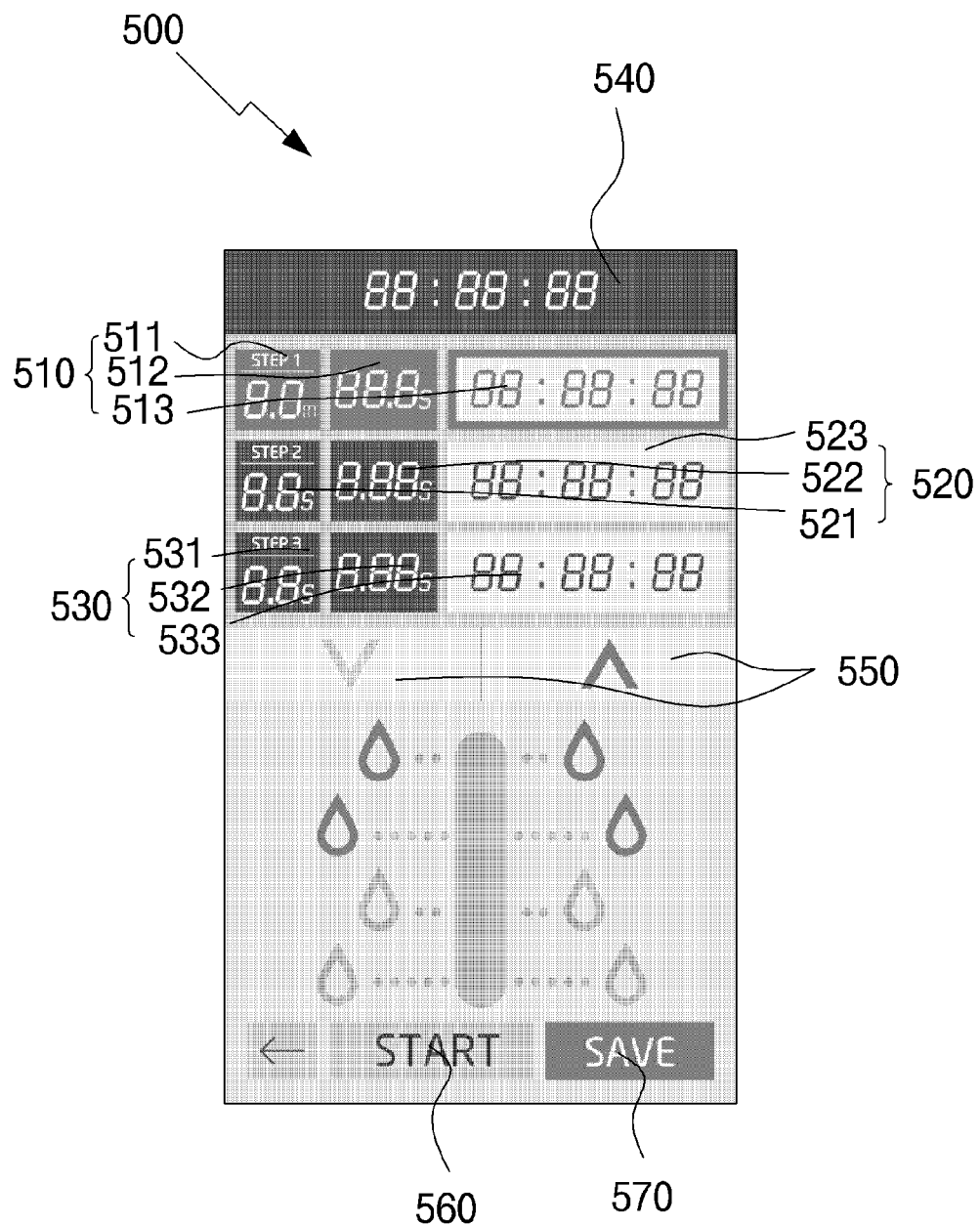
FIG. 9 is a view showing a digital operation unit of the Dutch coffee extraction apparatus according to the present invention.
Figure 10:
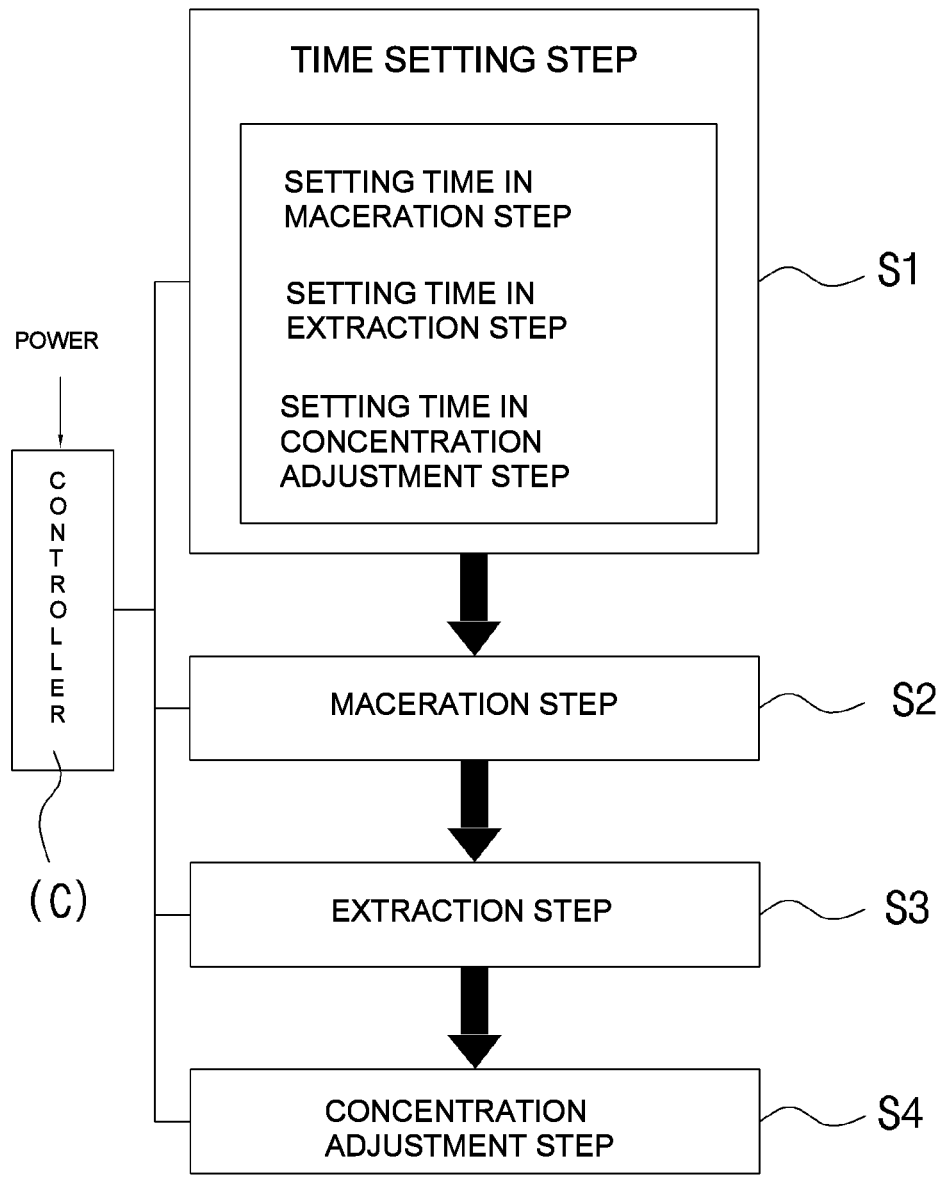
FIG. 10 is a sequence diagram showing a method for extracting Dutch coffee according to the present invention.
Figure 11:
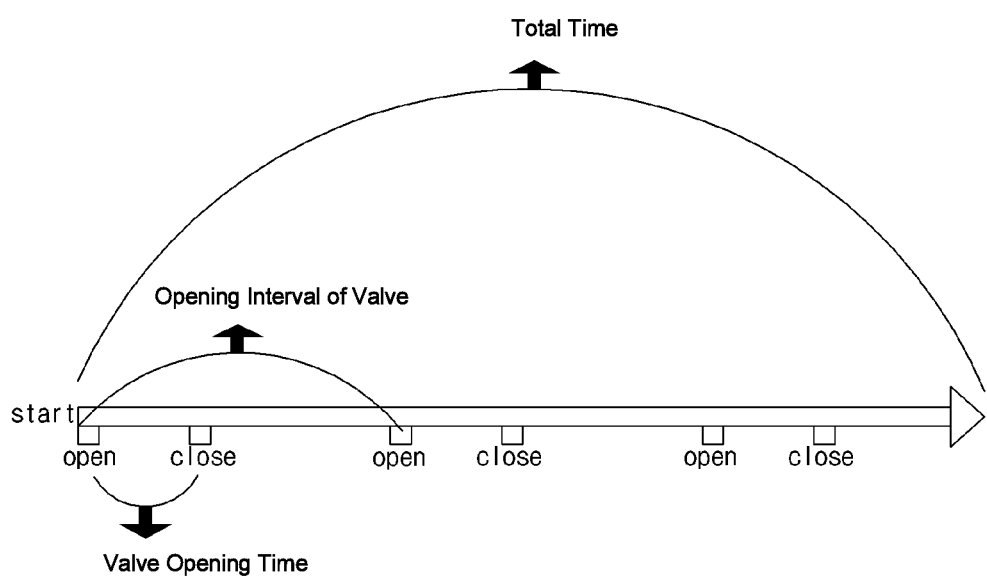
FIG. 11 is a schematic view showing opening and closing a valve in the Dutch coffee extraction method according to the present invention.

Specifically, as shown in FIG. 6, one cycle length refers to a length of time between a time at which the valve is opened and a time at which the vale is opened again after being closed.

In addition, the valve opening time refers to time during which the opened valve maintains its open state until it is closed, and the total time refers to time during which the valve is opened and closed continuously in one step.

In this case, the time setting step (S1) may be performed in each of the maceration step (S2), the extraction time (S3), and the concentration adjustment step (S4), and specifically, may be divided into a step of setting time in the maceration step and a step of setting time in the extraction time, and may set one cycle length, opening time of the valve, and total time in each setting step.

The time setting step (S1) and control in each step may be automatically performed by a controller (c), and the controller (c) for mechanically controlling may include a microcomputer. Accordingly, Dutch coffee may be extracted during a predetermined time repeatedly at regular time intervals.

The Dutch coffee extraction method may include the maceration step (S2) and the extraction step (S3), and the maceration step (S2) refers to a step of macerating coffee power by pouring water over coffee powder contained in the filtering container once or several times repeatedly during a predetermined time at regular intervals such that coffee powder absorbs water, and this step is to facilitate extracting in the extraction step.

In addition, the extraction step (S3) is performed after the maceration step (S2) and is to repeatedly extract Dutch coffee during a predetermined time at regular time intervals.

Herein, one cycle length, valve opening time, and total time may be set differently in each step, such that the amount of extracted coffee and the speed of extraction vary according to a step, and the aroma and flavor of extracted Dutch coffee can be made to be rich and soft, and also, the maximum amount of extracted liquid that can be extracted from Coffee powder can be extracted.

In the maceration step (S2) which is performed first, the opening time of the valve may be set to 0.1-10 seconds, the one cycle length may be set to 10-99 minutes, and the total time required to repeat opening and closing of the vale may be set to 10 minutes to 3 hours.

Herein, a method of supplying water one time or a method of supplying water several times within the above-described time range may be selected and set. Since the method of supplying water several times is similar to a concept in the extraction step which will be described below, only the method of supplying water one time will be described.

Supplying water to the filtering container 10 one time refers to a concept that water is supplied one time and the supplied water is absorbed into coffee powder as it is, and the coffee power is left in that state during a long time and is macerated. For example, the opening time of the valve may be set to 10 seconds, the one cycle length may be set to 30 minutes, and the total time required to repeat the opening and closing of the valve may be set to 30 minutes. In this case, water is initially supplied during 10 seconds and the supplied water macerates coffee powder while staying in the coffee powder.

In this case, the valve opening time may be adjusted to make the amount of water supplied to the filtering container be 5-20 wt % of the amount of coffee powder contained in the filtering container. Herein, when water is less than 5 wt %, the entire coffee powder is not fully macerated, and, when water exceeds 20 wt %, water is not absorbed into coffee powder and the excessive amount of water flows down as it is.

In addition, when the opening time of the valve is less than 0.1 second in the maceration step (S2), water is not fully absorbed into coffee powder and a smooth solvent action is inhibited, such that there is a problem that good flavor and aroma are not provided.

In addition, when the opening time of the valve exceeds 10 seconds, water is excessively absorbed into coffee powder and ingredients are rapidly discharged, such that proper aroma and flavor of coffee cannot be extracted.

In addition, when the one cycle length is set to be less than 10 minutes, coffee powder does not keep water therein during enough time and water moves down due to the gravity, such that coffee powder does not endure osmotic pressure and coffee is not macerated any more, and there is a problem in extracting coffee.

In addition, when the one cycle length exceeds 99 minutes, a maximum value of an action of extracting ingredients of coffee beans is exceeded and a bitter flavor is extracted from coffee beans having water solubility.

In addition, when the total time is less than 10 minutes, the amount of water necessary for macerating coffee powder is small and the yield of the coffee extraction process is reduced, such that the flavor of coffee is spoiled. On the other hand, when the total time exceeds 3 hours, the yield of the coffee extraction process increases and there is a problem that an oily flavor rather than a rich flavor is brought out.

The step of setting time in the extraction step (S3) which is performed secondly will be described. First, the opening time of the valve may be set to 0.01 to 10 seconds, the one cycle length may be set to 1-99 seconds, and the total time required to repeat the opening and closing of the valve may be set to 2-24 hours.

In the extraction step (S3), when the opening time of the valve is less than 0.01 second, the amount of water is reduced and the speed of movement of coffee ingredients is reduced, and simultaneously, an excessive amount of coffee ingredients is extracted, such that a bad flavor which is extracted after the steps of flavors preferred by normal people (sour flavor→sweet flavor→savory flavor→bitter flavor) is induced and quality deteriorates. When the opening time of the valve exceeds 10 seconds, the amount of water increases and the speed of movement of coffee ingredients increases, such that an effect of extracting ingredients of coffee appropriately cannot be achieved, and the flavor becomes weak, a bad flavor is brought out, and the savory flavor is reduced.

When the one cycle length is less than 1 second, time during which water is in contact with oxygen in air is reduced and thus hydrolysis is not performed well between coffee and water, such that a process in which a non-aqueous compound is decomposed into small particles is influenced, and a bad flavor is brought out. When the one cycle length exceeds 99 seconds, time during which water is in contact with oxygen in air increases and thus hydrolysis is excessively activated, such that a bad flavor is extracted.

In addition, when the total time required to repeat the opening and closing of the valve is less than 2 hours, a small amount of ingredients is extracted in the extraction process such that density and a sense of weight that a user feels in his/her mouth become lighter and the flavor is spoiled. When the total time required to repeat the opening and closing of the valve exceeds 24 hours and thus the time spent extracting increases, a large amount of ingredients is extracted in the extraction process, such that the density and the sense of weight that a user feels in his/her mouth when sipping coffee become heavier, and the flavor is strong and a bad flavor is brought out.

After the maceration step (S2) and the extraction step (S3), the concentration adjustment step (S4) of adjusting the concentration of the extracted coffee may be additionally performed. However, this should not be considered as limiting.

In other words, the concentration adjustment step (S4) may be performed after the extraction step (S3). In this step, the concentration of Dutch coffee may be adjusted by increasing the amount of supplied water, while the extraction of Dutch coffee is performed during a predetermined time repeatedly at regular intervals.

In addition, in the concentration adjustment step (S4), the opening time of the valve may be set to 0.01-10 seconds, the one cycle length may be set to 1-99 seconds, and the total time required to repeat the opening and closing of the valve may be set to 10 minutes-2 hours.

Furthermore, when the opening time of the valve is less than 0.01 second, the amount of water decreases and the concentration of Dutch coffee increases. When the time during which the valve maintains its open state from the time it is opened exceeds 10 seconds, the amount of water increases and the concentration of Dutch coffee is reduced.

In addition, in the concentration adjustment step (S4), when the one cycle length is less than 1 second, the amount of water increases and the concentration of Dutch coffee is reduced, and, when the one cycle length exceeds 99 seconds, the amount of water is reduced and the concentration of Dutch coffee increases. Therefore, there is a problem in adjusting the concentration.

In addition, when the total time required to repeat the opening and closing of the valve exceeds 2 hours, the amount of water excessively increases and the concentration of an undiluted solution of Dutch coffee which is extracted in the maceration step (S2) and the extraction step (S3) greatly decreases, such that there is a problem that the aroma and the savory flavor of coffee are spoiled.

Regarding a ratio of an undiluted solution of Dutch coffee extracted in the maceration step (S2), the extraction step (S3), and the concentration adjustment step (S4), 0-5% may be extracted in the maceration step (S2), 85-90% may be extracted in the extraction step (S3), and 5-10% may be extracted in the concentration adjustment step (S4) with reference to 100% of an undiluted solution which can be extracted from coffee powder. Herein, when the ratio of the undiluted solution extracted in the maceration step is 0%, water is just inputted to macerate coffee powder, and an undiluted solution is not extracted.

In the maceration step, a small amount of coffee is extracted, but an undiluted solution is brewed since water is initially supplied. Therefore, an undiluted solution of a relatively high concentration may be extracted. Since long time is spent extracting in the extraction time (S3), the undiluted solution may be extracted from coffee powder at the highest rate.

In addition, in the concentration adjustment step (S4), water is supplied to the coffee powder from which the most amount of an undiluted solution is extracted, and water is supplied for the purpose of adjusting the concentration of the extracted coffee. Therefore, the undiluted solution may be extracted at the lowest rate.

According to the method for extracting Dutch coffee, ground coffee powder is put into the filtering container, power is supplied to supply water from the water tank and to extract Dutch coffee by passing water through the filtering container, and time in the maceration step may be controlled such that dry coffee powder sufficiently absorbs water and coffee is extracted.

In addition, in the extraction step, the total time may be adjusted so as to extract the extracted liquid continuously and rapidly, and, in the concentration adjustment step (S3), time may be adjusted to adjust the concentration of the extracted Dutch coffee.

When time is set in the maceration step (S2), the extraction step (S3), and the concentration adjustment step (S4), the Dutch coffee extraction apparatus 1 may be operated by pressing the start button 560, and Dutch coffee may be extracted by performing the maceration step (S2), the extraction step (S3), and the concentration adjustment step (S4) in sequence by the controller.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims.

EXPLANATION OF SIGNS

1: Dutch coffee extraction apparatus
10: Filtering container
20: Water tank
30: Extracted liquid storage container
100: Filtering container upper cover
200: Distributing means
300: Container main body
400: Filtering container lower cover
500: Digital operation unit
600: Extracted liquid conveying means
700: Extraction inducing means
S1: Time setting step
S2: Maceration step
S3: Extraction step
S4: Concentration adjustment step

What is claimed is:

1. A Dutch coffee extraction apparatus comprising:
an upper main body frame;
a lower main body frame which is formed on a lower portion of the upper main body frame and has a width shorter than that of the upper main body frame;
a side frame which connects the upper main body frame and the lower main body frame with each other;
a water tank which is disposed inside the upper main body frame and has a cover provided on an upper portion thereof to store water therein;
a filtering container which is disposed at one side of the lower main body frame, is connected with the water tank via a nozzle to receive water from the water tank, and stores ground coffee thereon;
an extracted liquid storage container which is disposed under the filtering container to store an extracted liquid thereon; and
a digital operation unit which is formed on one side of the side frame and sets to operate the apparatus by adjusting a valve opening time, one cycle length, and a total time in a maceration step, an extraction step, and a concentration adjustment step,
wherein the filtering container comprises:
a container main body which is formed in a cylindrical shape, penetrating from top to bottom;
a distributing means which comprises:
a water supply surface which is formed on an upper end of the container main body and is downwardly inclined from a center toward a side surface of the distributing means so as to spray water supplied through the nozzle into the container main body;
a water flow blocking surface which is upwardly inclined from an end of the water supply surface toward the side surface;
a plurality of water passing holes passing through a top surface and a bottom surface of the water supply surface; and
a center drop inducing means which is formed on the top surface and the bottom surface of the water supply surface at a point spaced from the center of the water supply surface toward an outer circumference of the water supply surface by a predetermined distance, and protrudes in an annular shape so as to prevent the supplied water from flowing down along a wall surface of the filtering container;
a filtering container upper cover which is formed to cover an upper portion of the distributing means and has a water supply portion formed thereon to receive water from the water tank; and
a filtering container lower cover which has an upper portion inserted into an inner surface of a lower portion of the container main body, and a lower portion formed in a funnel shape.

2. The Dutch coffee extraction apparatus of claim 1, wherein an extraction inducing means is inserted into the filtering container lower cover, and comprises a body which is formed in a cylindrical shape and is hollow inside, and a plurality of ribs which are formed on the cylindrical body in a radial direction so as to correspond to an inner inclined surface of the filtering container lower cover.

3. The Dutch coffee extraction apparatus of claim 2, wherein a filter is additionally provided on upper portions of the ribs and coffee powder is contained on an upper portion of the filter.

4. The Dutch coffee extraction apparatus of claim 1, wherein a suction inducing means is additionally formed on a top surface of the filtering container upper cover, and is downwardly inclined from a point spaced from a circumference of the top surface of the filtering container upper cover by a predetermined distance to the water supply portion to prevent an aroma of extracted Dutch coffee from dissipating.

5. The Dutch coffee extraction apparatus of claim 1, wherein each of the water passing holes is formed by passing through the water supply surface and has a diameter larger on a bottom surface than a top surface, and the water passing holes are formed to draw concentric circles on the water supply surface, and wherein the plurality of water passing holes are formed from the center of the water supply surface along the outer circumference at regular intervals.

6. The Dutch coffee extraction apparatus of claim 1, wherein the filtering container lower cover comprises:

a container main body insertion portion which is inserted into the container main body, being spaced from a circumference of the container main body by a predetermined distance, and is inwardly inclined;

a container main body contacting portion which protrudes from a lower portion of the container main body insertion portion outwardly, and has a sealing member inserted thereinto so as to be brought into close contact with the container main body;

a vertical portion which vertically extends from a bottom surface of the container main body contacting portion at a point inwardly spaced from a circumference of the container main body contacting portion;

a container main body seating portion which protrudes from an end of the vertical portion outwardly so as to have an end of the container main body seated thereon; and a funnel portion which is downwardly inclined from a lower portion of the container main body seating portion toward a center thereof, and has an extraction pipe passing through the center thereof in a vertical direction.

7. The Dutch coffee extraction apparatus of claim 1, wherein the digital operation unit comprises:

a maceration step setting display unit which displays set times of the maceration step, and comprises a first opening interval display member for displaying the one cycle length, a first opening time display member for displaying the valve opening time, and a first total time display member for displaying the total time;

an extraction step setting display unit which displays set times of the extraction step, and comprises a second opening interval display member for displaying the one cycle length, a second opening time display member for displaying the valve opening time, and a second total time display member for displaying the total time; and a concentration adjustment setting display unit which displays set times of the concentration adjustment step, and comprises a third opening interval display member for displaying the one cycle length, a third opening time display member for displaying the valve opening time, and a third total time display member for displaying the total time.

* * * * *